(12) United States Patent
Funasaki

(10) Patent No.: US 10,367,680 B2
(45) Date of Patent: Jul. 30, 2019

(54) NETWORK RELAY APPARATUS, GATEWAY REDUNDANCY SYSTEM, PROGRAM, AND REDUNDANCY METHOD

(71) Applicant: NEC Corporation, Tokyo (JP)

(72) Inventor: Tomoshige Funasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 15/547,334

(22) PCT Filed: Jan. 4, 2016

(86) PCT No.: PCT/JP2016/000003
§ 371 (c)(1),
(2) Date: Jul. 28, 2017

(87) PCT Pub. No.: WO2016/121293
PCT Pub. Date: Aug. 4, 2016

(65) Prior Publication Data
US 2018/0006876 A1 Jan. 4, 2018

(30) Foreign Application Priority Data
Jan. 28, 2015 (JP) .................................. 2015-013978

(51) Int. Cl.
| | |
|---|---|
| *H04L 12/24* | (2006.01) |
| *H04L 12/66* | (2006.01) |
| *H04L 12/707* | (2013.01) |
| *H04L 12/933* | (2013.01) |

(52) U.S. Cl.
CPC .......... *H04L 41/0663* (2013.01); *H04L 12/66* (2013.01); *H04L 45/22* (2013.01); *H04L 41/0668* (2013.01); *H04L 49/15* (2013.01)

(58) Field of Classification Search
CPC ..... H04L 41/0663; H04L 12/66; H04L 45/22; H04L 41/0668; H04L 49/15
See application file for complete search history.

(56) References Cited

U.S. PATENT DOCUMENTS

| | | | |
|---|---|---|---|
| 7,269,132 B1 * | 9/2007 | Casey | ................. H04L 41/0663 370/219 |
| 2009/0016215 A1 | 1/2009 | Nadas et al. | |

(Continued)

FOREIGN PATENT DOCUMENTS

| | | |
|---|---|---|
| EP | 2482524 | 8/2012 |
| JP | 2002-135303 | 5/2002 |

(Continued)

OTHER PUBLICATIONS

Japanese Office Action for Application No. 2016-571830, dated May 9, 2018, with English translation.

(Continued)

*Primary Examiner* — Christopher M Crutchfield
*Assistant Examiner* — Tito Q Pham
(74) *Attorney, Agent, or Firm* — Young & Thompson

(57) ABSTRACT

Provided is a network relay apparatus of a gateway redundancy system, including: a storage unit configured to store, as an internal status, a redundancy status for indicating whether the network relay apparatus operates as an active system or a standby system for each subscriber terminal or subscriber terminal group, and a subscriber status for indicating a list of used address information for each subscriber terminal; and a management unit configured to: monitor communication between another network relay apparatus in a redundancy configuration and a subscriber terminal group; record, into the storage unit, used address information assigned by the another network relay apparatus to a subscriber terminal as a part of the subscriber status; and notify or advertise the sequentially recorded internal status to a notification destination sequentially at a predetermined timing.

12 Claims, 16 Drawing Sheets

(56) References Cited

U.S. PATENT DOCUMENTS

| | | | | |
|---|---|---|---|---|
| 2012/0113799 A1* | 5/2012 | Chen | ............... | H04L 45/28 |
| | | | | 370/217 |
| 2012/0179826 A1* | 7/2012 | Leng | ............... | H04L 61/2007 |
| | | | | 709/226 |
| 2012/0198096 A1* | 8/2012 | Leng | ............... | H04L 12/2856 |
| | | | | 709/245 |
| 2012/0290869 A1* | 11/2012 | Heitz | ............... | H04L 69/16 |
| | | | | 714/4.11 |
| 2014/0078887 A1* | 3/2014 | Yu | ............... | H04L 43/0811 |
| | | | | 370/219 |

FOREIGN PATENT DOCUMENTS

| | | |
|---|---|---|
| JP | 2003-348136 | 12/2003 |
| JP | 2007-312289 | 11/2007 |
| JP | 2008-113260 | 5/2008 |
| JP | 2009-303090 | 12/2009 |
| JP | 2013-500651 | 1/2013 |
| WO | 2007-117461 | 10/2007 |

OTHER PUBLICATIONS

International Search Report, PCT/JP2016/000003, dated Feb. 9, 2016.
Non Patent Document 1: RFC5798, Virtual Router Redundancy Protocol (VRRP) Version 3 for IPv4 and IPv6, Mar. 2010.
Non Patent Document 2: RFC4862, IPv6 stateless Address Autoconfiguration, Sep. 2007.
Extended European Search Report for Application No. 16742902, dated Aug. 3, 2018.

* cited by examiner

(a) SUBSCRIBER INFORMATION 122

| ID | Port | S-tag | C-tag | IP Pool | IP Prefix |
|---|---|---|---|---|---|
| | | | | | |
| | | | | | |
| | | | | | |

(b) SUBSCRIBER INFORMATION 222

| ID | Port | S-tag | C-tag | IP Pool | IP Prefix |
|---|---|---|---|---|---|
| | | | | | |
| | | | | | |
| | | | | | |

(c) IP Pool INFORMATION 130

| Name | IP Pool Prefix | redundancy group |
|---|---|---|
| IP-pool-01 | 2001:db8:100::/48 | 1 |
| IP-pool-02 | 2001:db8:200::/48 | 2 |

(d) IP Pool INFORMATION 230

| Name | IP Pool Prefix | redundancy group |
|---|---|---|
| IP-pool-01 | 2001:db8:100::/48 | 1 |
| IP-pool-02 | 2001:db8:200::/48 | 2 |

(e) REDUNDANCY INFORMATION 142

| redundancy group | S-tag | priority | status | idle time |
|---|---|---|---|---|
| 1 | 1000 | 180 | | |
| 2 | 2000 | 150 | | |

(f) REDUNDANCY INFORMATION 242

| redundancy group | S-tag | priority | status | idle time |
|---|---|---|---|---|
| 1 | 1000 | 150 | | |
| 2 | 2000 | 180 | | |

(g) IP Route INFORMATION 152

| IP prefix | Metric | Interface | Next Hop |
|---|---|---|---|
| | | | |
| | | | |
| | | | |

(h) IP Route INFORMATION 252

| IP prefix | Metric | Interface | Next Hop |
|---|---|---|---|
| | | | |
| | | | |
| | | | |

FIG. 4

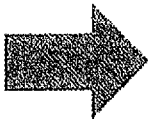
FIG. 6

FIG. 15

NETWORK RELAY APPARATUS, GATEWAY REDUNDANCY SYSTEM, PROGRAM, AND REDUNDANCY METHOD

TECHNICAL FIELD

This invention relates to a gateway redundancy system for operating, in a redundancy configuration, network relay apparatus serving as gateways for connecting an access network to another network.

BACKGROUND ART

In recent years, many communication infrastructures have adopted a network configuration in which networks are connected to each other using a gateway.

Further, many communication infrastructures operate a plurality of gateway apparatus in a redundancy configuration.

To configure redundancy of a plurality of gateway apparatus, there is often adopted an architecture (active-standby configuration) of one gateway apparatus being set to an active system and another gateway apparatus being set to a standby system, to cause standby system resources to stand by in a standby mode.

Meanwhile, there is also known an architecture (active-active configuration) of two gateway apparatus being associated with each other to form a dependency relationship between an active system and a standby system and to operate both the gateway apparatus as active systems. In this architecture, when one of two gateway apparatus in a redundancy configuration has failed, the other gateway apparatus switches to the active system for handling a subscriber terminal of the failed gateway apparatus. Thus, redundancy of communication by subscribers is secured. The active-active configuration is superior to the active-standby configuration in terms of load balancing characteristics.

Related art is disclosed in Patent Document 1 and Patent Document 2. Further, technologies of components to be used in a network system are disclosed in, for example, Non Patent Document 1 and Non Patent Document 2.

In Patent Document 1, there is disclosed a packet transfer system for relaying packets between subscriber terminals and the Internet. The packet transfer system is configured to connect an access network to a relay network using a gateway apparatus as its architecture for relaying packets to be communicated between an arbitrary subscriber terminal and the Internet. Further, in this network architecture, two gateway apparatus that connect the access network to the relay network in a redundancy configuration handle the subscriber terminals.

In Patent Document 2, there is disclosed a system having a network architecture similar to that of Patent Document 1, which includes a gateway load balancing apparatus in an access network as a system for balancing loads of a group of subscriber terminals among a plurality of gateway apparatus.

In Non Patent Document 1, there is disclosed a request for comments (RFC) specifying the virtual router redundancy protocol (VRRP), which is described as an example of a redundancy protocol in an embodiment of this invention.

In Non Patent Document 2, there is disclosed an RFC specifying IPv6 router advertisement (RA), which is described as an example of IP prefix advertisement in an embodiment of this invention.

PRIOR ART DOCUMENT(S)

Patent Document(s)

Patent Document 1: JP-A-2007-312289
Patent Document 2: JP-A-2008-113260

Non Patent Document(s)

Non Patent Document 1: RFC5798, Virtual Router Redundancy Protocol (VRRP) Version 3 for IPv4 and IPv6, March 2010
Non Patent Document 2: RFC4862, IPv6 Stateless Address Autoconfiguration, September 2007

SUMMARY OF THE INVENTION

Problem to be Solved by the Invention

In general, the active-standby system has hitherto been adopted to configure redundancy of a plurality of gateway apparatus. It can be said that adoption of the active-active system for configuration of redundancy of the gateway apparatus integrally achieves distribution of the number of subscriber terminals and communication amounts as well as the redundancy, which is desirable in terms of efficient use of apparatus resources.

However, the inventor of this invention recognizes some technical problems to be solved in the current gateway apparatus system and network communication technology when adopting the active-active redundancy configuration.

In the following, a description is given of problems suggested by the inventor of this invention taking a layer 2 (L2) frame relay network architecture as an example. This network architecture is described with reference to FIG. 16. This case is an example of operating a plurality of broadband access server (BRAS) apparatus (network relay apparatus) in an active-active redundancy configuration in consideration of load balancing. Each BRAS apparatus operates as a gateway for relaying communication between an access network and a core network.

Assume that certain customer premises equipment (CPE) (subscriber terminal) is handled by a BRAS apparatus in a currently active system and some phenomenon causes the CPE to be handled by a BRAS apparatus serving as a standby system. In this case, this CPE cannot continue its communication using an IP prefix (IP address) that was designated by the formerly active BRAS apparatus.

As a result, this CPE again needs to be approved by an authentication/authorization/accounting (AAA) server via the BRAS apparatus that has newly become the active system. The CPE is approved by the AAA server, assigned an IP prefix (IP address) by the BRAS apparatus that has switched to the active system, and then resumes communication. The assignment herein refers to an apparatus for managing IP addresses/prefixes of, for example, BRASes, routers, and DHCP servers, determining an IP address/prefix to be assigned to each subscriber terminal, and notifying the subscriber terminals of the determined IP addresses/prefixes using some protocol.

In other cases, assume that some phenomenon causes both BRAS apparatus in a redundancy configuration to notify or advertise settings indicating the active system or values indicating the same priority. In this case, other terminals or devices cannot identify which BRAS apparatus is the right gateway (to use). The advertisement herein refers to propagation of path information held by the router or other components themselves to another router or other components connected using a routing protocol.

Thus, the behavior of a core router may deviate from an ideal operation, for example, when the same IP route is advertised by both the BRAS apparatus to the core router. As a result, the CPE may not be able to normally communicate to/from the core network. Otherwise, the communication speed may deteriorate or network resources may be consumed wastefully. In addition, current network systems do not have an algorithm for quickly recovering from this failure.

There is no description of solutions to those problems in Patent Document 1 and Patent Document 2.

In view of the above, the inventor of this invention has developed a gateway apparatus for preventing problems that may occur due to several technical specifications inherent in the current system based on an architecture in which a plurality of network relay apparatus in an active-active redundancy configuration handle subscriber terminals in a distributed manner.

This invention has been made in view of the above-mentioned points of focus, and provides a gateway redundancy system that may improve continuity of communication between subscriber terminals and a relay destination network.

Means to Solve the Problem

According to one embodiment of this invention, there is provided a network relay apparatus, the network relay apparatus for relaying communication between an access network and a relay destination network, including, a storage unit configured to store, as an internal status, a redundancy status for indicating whether the network relay apparatus operates as an active system or a standby system for each subscriber terminal or subscriber terminal group, and a subscriber status for indicating a list of used address information for each subscriber terminal, and a management unit configured to, monitor communication between another network relay apparatus in a redundancy configuration and a subscriber terminal group, record, into the storage unit, used address information assigned by the another network relay apparatus to a subscriber terminal as a part of the subscriber status, and notify or advertise the sequentially recorded internal status to a notification destination sequentially at a predetermined timing.

According to one embodiment of this invention, there is provided a gateway redundancy system, comprising a plurality of network relay apparatus each of which is configured to relay communication between an access network and a relay destination network as a gateway and to store, in a storage unit, an internal status for determining an operation to be performed for the relaying; each of the plurality of network relay apparatus being configured to: sequentially record into the storage unit, as the internal status, a redundancy status for indicating whether the each of a plurality of network relay apparatus operates as an active system or a standby system for each subscriber terminal or subscriber terminal group, and a subscriber status for indicating a list of used address information for each subscriber terminal, notify or advertise a message containing a predetermined status to a notification destination sequentially at a predetermined timing, and monitor communication that has reached the each of the plurality of network relay apparatus to sequentially record used address information assigned by another network relay apparatus to a subscriber terminal into the storage unit while relaying communication between the access network and the relay destination network.

According to one embodiment of this invention, there is provided a program for causing a processor of a network relay apparatus to operate as, a logical storage unit configured to record a redundancy status for indicating whether the network relay apparatus operates as an active system or a standby system for each subscriber terminal or subscriber terminal group, and a subscriber status for indicating a list of used address information for each subscriber terminal; and a management unit configured to, monitor communication between another network relay apparatus in a redundancy configuration and a subscriber terminal group, record, into a physical storage unit handling the logical storage unit, used address information assigned by the another network relay apparatus to a subscriber terminal as a part of the subscriber status; and notify or advertise a message containing a predetermined status to a notification destination sequentially at a predetermined timing.

According to one embodiment of this invention, there is provided a redundancy method for a network relay apparatus, the redundancy method including, sequentially managing, by a network relay apparatus configured to relay communication between an access network and a relay destination network, in a storage unit, a redundancy status for indicating whether the network relay apparatus operates as an active system or a standby system for each subscriber terminal or subscriber terminal group, and a subscriber status for indicating a list of used address information for each subscriber terminal, notifying or advertising, by the network relay apparatus, a message containing a predetermined status to a notification destination sequentially at a predetermined timing, monitoring, by the network relay apparatus, communication between another network relay apparatus in a redundancy configuration and a subscriber terminal group; and, recording and managing, by the network relay apparatus, in the storage unit, used address information assigned by the another network relay apparatus to a subscriber terminal as a part of the subscriber status.

Effect of the Invention

According to this invention, it is possible to provide the gateway redundancy system that may improve the continuity of communication between the subscriber terminals and the relay destination network.

BRIEF DESCRIPTION OF THE DRAWING

FIG. 4 includes tables each for showing an example of initial settings of each piece of setting information held by a BRAS apparatus 100 or a BRAS apparatus 200.

FIG. 6 is an explanatory diagram for exemplifying changes in redundancy information 142 and 242 updated through exchange of redundancy protocol messages.

FIG. 15 is an explanatory diagram for exemplifying changes in the redundancy information 142 and 242 and the IP route information 152 and 252 updated through exchange of route information messages.

MODE(S) FOR EMBODYING THE INVENTION

An embodiment of this invention is described below with reference to the drawings.

Figure 1:
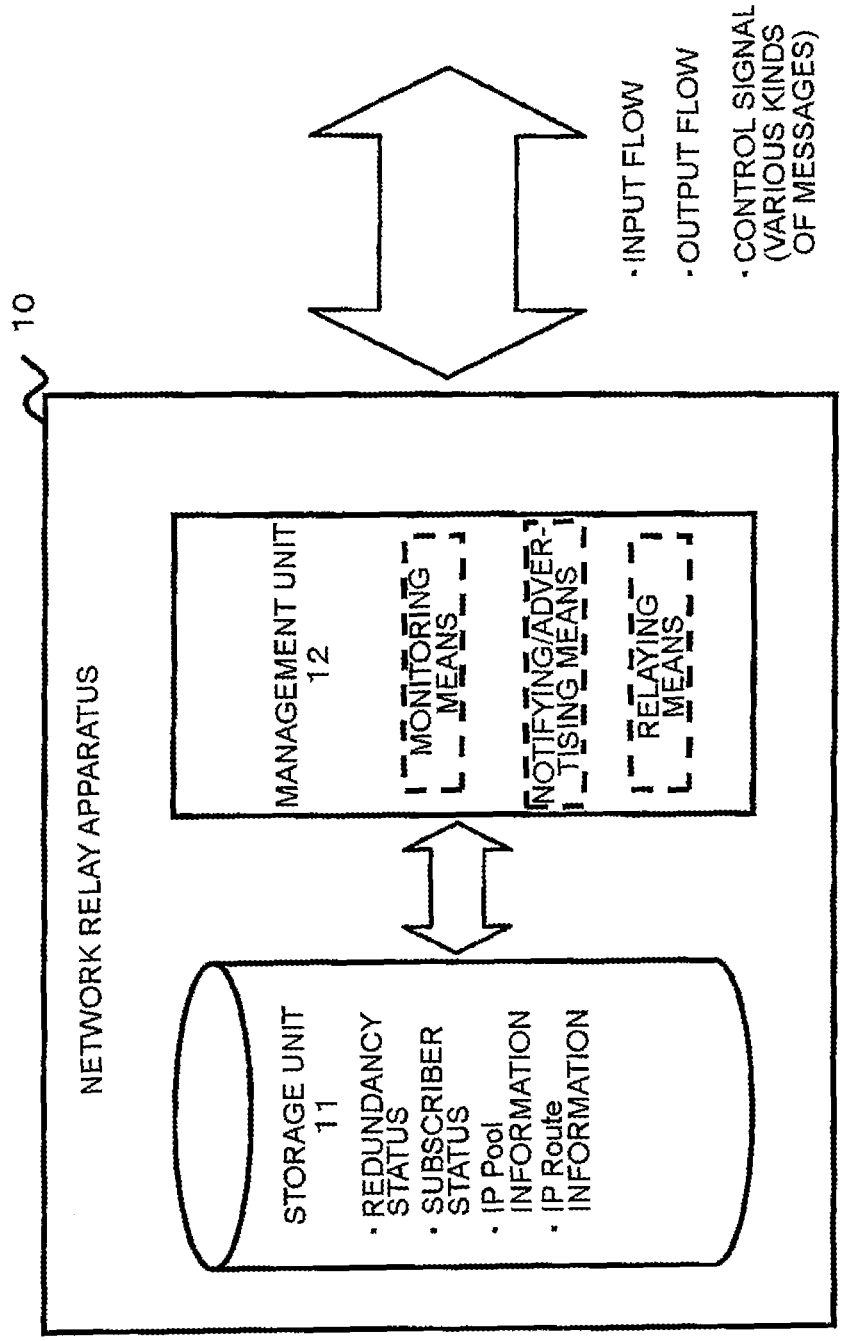
FIG. 1 is a configuration diagram for illustrating a network relay apparatus according to an embodiment of this invention.

FIG. 1 is a configuration diagram for illustrating a network relay apparatus according to the embodiment.

A network relay apparatus 10 is configured to operate as a gateway for relaying communication between an access network and a relay destination network (for example, a mobile core network or an internet service provider (ISP) network). The network relay apparatus 10 holds various kinds of internal statuses, and determines its own operation such as an operation as an active system or an operation as an standby system for, for example, a given subscriber terminal in accordance with the internal status. In the following, the status or information means a container of information as well as the meaning of the information.

Figure 16:
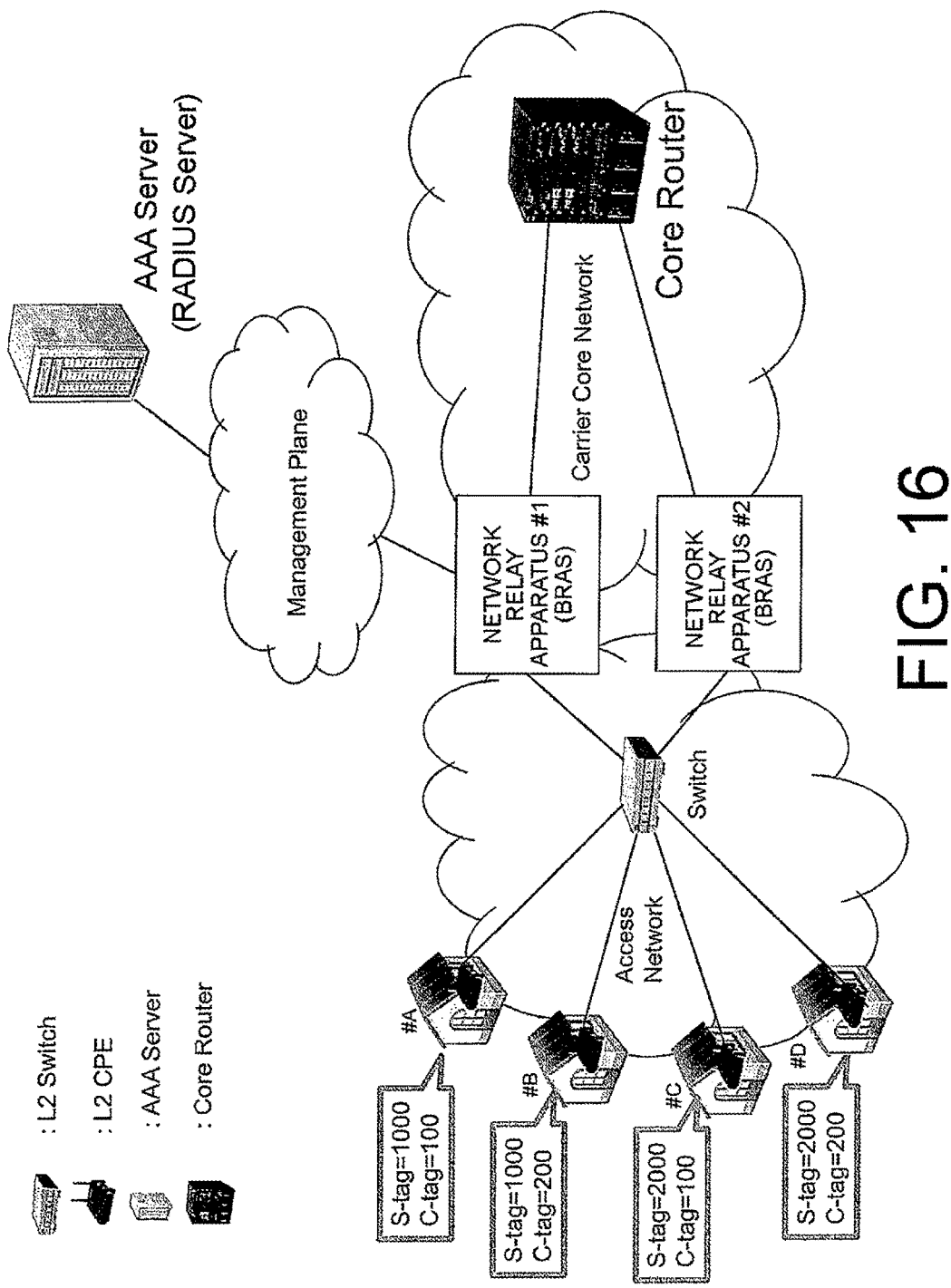
FIG. 16 is an explanatory diagram for exemplifying an L2 frame relay network architecture having a gateway redundancy configuration.

The network relay apparatus 10 provides a redundancy configuration formed by a plurality of gateways to each subscriber terminal in cooperation with other network relay apparatus (not shown). In the following description, it is assumed that the same arrangement as that of FIG. 16 is adopted as the network configuration, and other network relay apparatus also adopt a configuration and operation similar to those of the network relay apparatus 10 autonomously.

The network relay apparatus 10 includes a storage unit 11 configured to store an internal status, and a management unit 12 configured to record the internal status into the storage unit 11 and to perform notification/advertisement including a predetermined status to a notification destination sequentially at a predetermined timing. Description of ordinarily configured communication means (for example, a physical input/output unit, a logical communication interface, and a relay mechanism) included in the network relay apparatus 10 is simplified or omitted.

The management unit 12 records and manages a redundancy status and a subscriber status as an internal status in the storage unit 11. Further, in this embodiment, IP pool information, which is information on a group of addresses that can be assigned by the subject network relay apparatus, and IP route information (communication path information), which is information on communication paths, are recorded and managed in the storage unit 11.

Information for indicating whether the subject network relay apparatus operates as an active system or a standby system for each subscriber terminal or subscriber terminal group is recorded as the redundancy status.

Information for indicating a list of pieces of used address information for respective subscriber terminals is recorded as the subscriber status. Not only pieces of used address information assigned by the subject network relay apparatus but also pieces of used address information assigned by another network relay apparatus are recorded in this subscriber status.

For example, IP prefixes (IPv6) or IP addresses (IPv4) may be used as appropriate as the used address information depending on the communication system. Further, an IP pool number may be associated with the used address information for each subscriber terminal group. Further, a plurality of pieces of tag information used by the subscriber terminal group and subscriber terminals may be associated with the used address information through use of the subscriber status for operation.

The management unit 12 records various kinds of information containing the redundancy status and the subscriber status into the storage unit 11 as appropriate for management, and notifies those various kinds of information sequentially to a notification destination autonomously or as a response to some request. For example, when the management unit 12 receives a router solicitation (RS) from a subscriber terminal that desires to be assigned an IPv6 address, the management unit 12 assigns an IP address and notifies the information to the access network (advertisement).

In addition, the management unit 12 monitors ports of the subject network relay apparatus, and acquires used address information relating to an address assigned by another network relay apparatus to a subscriber terminal when another network relay apparatus and the subscriber terminal communicate to/from each other. Then, the management unit 12 records the information as the subscriber status. In this manner, when the subject network relay apparatus starts to operate as the active system for a subscriber terminal, the subject network relay apparatus may read the used address information that has been used by the subscriber terminal from the storage unit 11, and continue communication using the address as it is.

The management unit 12 and other network relay apparatus in a redundancy configuration set in advance may manage a plurality of the same IP pools, and the management unit 12 may use, for operation of the subject network relay apparatus serving as the active system, an IP pool that is not used for operation by the other network relay apparatus serving as the active system. Thus, it is desired that a plurality of IP pools be designated or assigned in advance to the management unit 12.

Further, it is desired that the management unit 12 be operated so as to monitor notification (advertisement) sent by another network relay apparatus in the same redundancy configuration to a subscriber terminal, for which the redundancy status indicates the standby system, and to snoop an address assigned to the subscriber terminal. Snooping herein refers to acquisition of a communication message that is based on a certain protocol by a certain third-party apparatus present in a network to utilize conveyed information details.

In this manner, the management unit 12 does not collect used address information (group) of a subscriber terminal (group) from the notified messages (group) more than necessary by narrowing down targets to be snooped.

Further, it is desired that the management unit 12 monitor communication standby time and a communication success amount for each subscriber terminal or subscriber terminal group recorded in the internal status, and record those pieces of information as a part of the internal status. It suffices that the internal status may contain the communication standby time and the communication success amount as communication status information.

The management unit 12 can use this communication status information to give a difference in priority of communication routes to be used by each subscriber terminal or each subscriber terminal group among the subject network relay apparatus and other network relay apparatus. As a result, the network relay apparatus 10 can advertise communication route information containing the priority to a predetermined destination. With this, it is possible to prevent communication paths provided by the subject network relay apparatus and other network relay apparatus from having the same settings as seen from another apparatus in the process of the subject network relay apparatus and the other network relay apparatus operating independently of one another autonomously.

A group of network relay apparatus handling subscriber terminals in a distributed manner in the active-active configuration autonomously execute the above-mentioned operation, to thereby achieve construction of a gateway redundancy system that may improve the continuity of communication between the subscriber terminals and the relay destination network. For example, communication and logical settings are more likely to be continued compared to the current gateway system in which communication and logical settings are temporarily disconnected at the time of, for example, switch between the active system/standby system for an arbitrary subscriber terminal, or failure/switch of specific equipment or paths.

To give a more specific example, a certain subscriber terminal that has switched a gateway to use can continue communication to/from the current address without being assigned a new address. With this, it is possible to prevent a problem that may occur due to change of addresses in various levels of layers. Further, it is possible to create a program in a service layer without considering change of addresses due to, for example, switch of gateways. Further, it is possible to prevent communication paths provided by network relay apparatus in a redundancy configuration and operating autonomously in a distributed manner from being likely to have the same settings.

Next, a description is given using a specific network configuration.

[Configuration]

Figure 2:
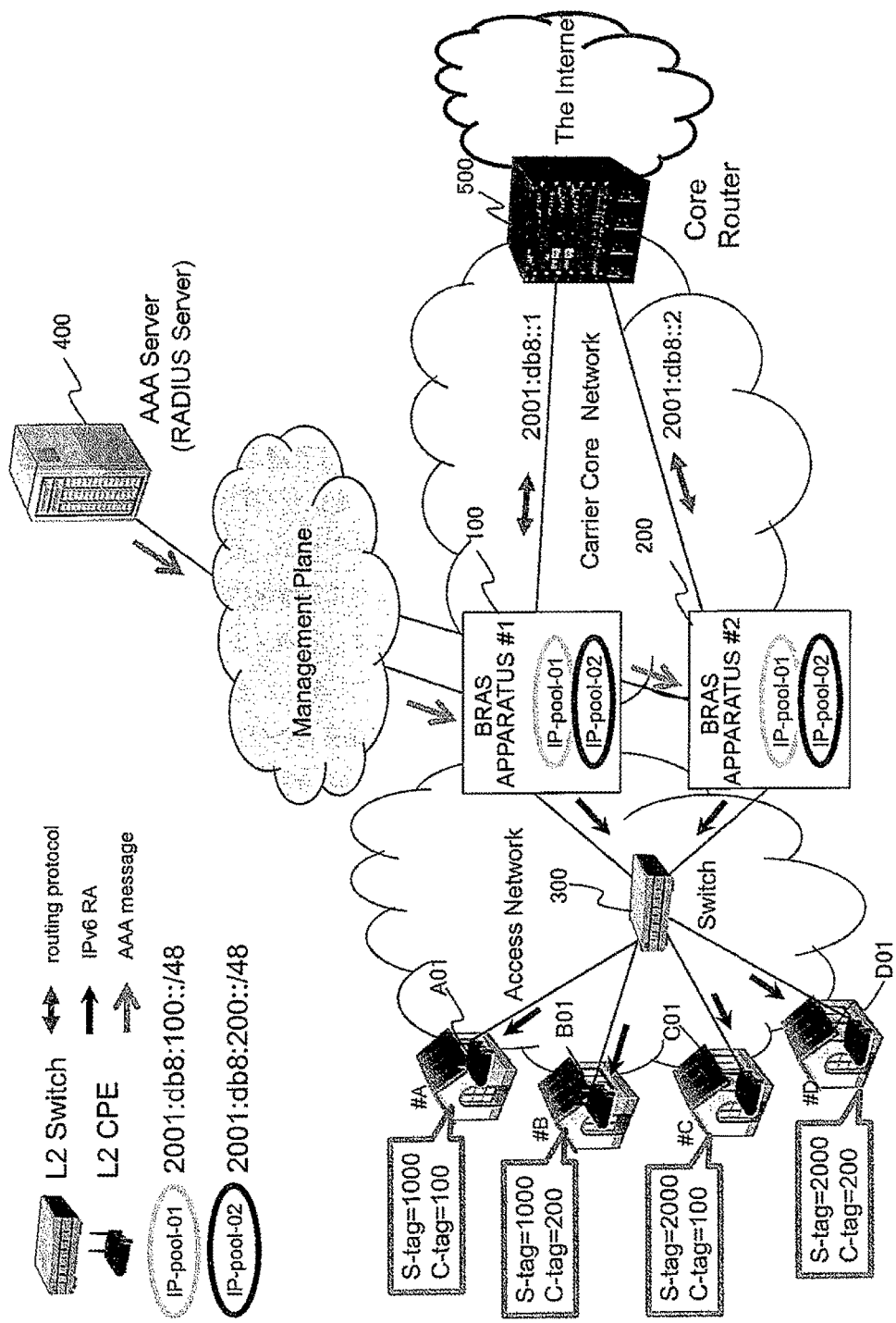
FIG. 2 is an explanatory diagram for illustrating a network architecture to be used for description of an embodied example.

FIG. 2 is an explanatory diagram for illustrating a network architecture based on which the description is given.

In the illustrated network architecture, a first BRAS apparatus 100 (#1) and a second BRAS apparatus 200 (#2) connect an access network and a carrier core network to each other for each CPE A01 to D01 in a redundancy configuration. Further, the carrier core network is connected to the Internet.

The first BRAS apparatus 100 and the second BRAS apparatus 200 each operate as a gateway apparatus serving as the active system or the standby system for each CPE A01 to D01.

An L2 switch 300 is installed between the first and second BRAS apparatus 100 and 200 and each CPE A01 to D01. The first BRAS apparatus 100 and the second BRAS apparatus 200 manage the same two IP pools (IP pool 01 and IP pool 02).

The first BRAS apparatus 100 and the second BRAS apparatus 200 are connected to an AAA server 400 via a management plane network. When the AAA server 400 is requested to, for example, authenticate a subscriber terminal (CPE) by the first and second BRAS apparatus 100 and 200, the AAA server 400 sends an authentication result of the subscriber terminal as a response. The AAA server 400 uses, for example, a remote authentication dial-in user service (RADIUS) protocol.

Further, the first BRAS apparatus 100 and the second BRAS apparatus 200 are connected to a core router 500 via the carrier core network. The core router 500 is responsible for relaying the traffic of subscriber terminals handled by the first and second BRAS apparatus 100 and 200 to an in-carrier server (not shown) or an external network (such as the Internet or another mobile network). The first and second BRAS apparatus 100 and 200 and the core router 500 appropriately exchange routes using routing protocols and forward an IP packet to be relayed to a proper destination.

The first BRAS apparatus 100 and the second BRAS apparatus 200 are connected to each of the CPEs A01, B01, C01, and D01 via the L2 switch 300. Each of the CPEs A01, B01, C01, and D01 adds a customer tag (c-tag) that conforms to Q-in-Q to received subscriber traffic, and sends the subscriber traffic to the access network. The L2 switch 300 adds a service tag (s-tag) that conforms to Q-in-Q to the subscriber traffic for relay. Further, the L2 switch 300 relays control traffic between the first BRAS apparatus 100 and the second BRAS apparatus 200.

Now, a simple description is given of traffic relay in the network. In this network configuration, traffic passing through the access network is tunneled in accordance with, for example, Q-in-Q (IEEE 802.1q). Further, the first and second BRAS apparatus 100 and 200 determine which plays the role of the active system (master) or the standby system (backup) using a redundancy management protocol (for example, VRRP) in units of s-tags (s-tag=1,000 and s-tag=2,000 in FIG. 2) handled by the first and second BRAS apparatus 100 and 200.

First, the AAA server 400 designates an IP pool number for each of the CPEs A01 to D01 when each subscriber is authenticated. The first and second BRAS apparatus 100 and 200 serving as an IP front end (IPFE) select an IP prefix to be assigned from the IP pool, and notify (advertise IP prefix) each of the CPEs A01 to D01 of the IP prefix using RA.

The first and second BRAS apparatus 100 and 200 have a redundancy configuration in units of s-tags through use of the VRRP. In this example, the first BRAS apparatus 100 plays the role of master for s-tag=1,000, whereas the second BRAS apparatus 200 plays the role of master for s-tag=2,000. Therefore, the first BRAS apparatus 100 handles the CPE A01 and the CPE B01 with s-tag=1,000, whereas the second BRAS apparatus 200 handles the CPE C01 and the CPE D01 with s-tag=2000. Further, the first and second BRAS apparatus 100 and 200 advertise the prefix of the IP pool assigned to the subscriber handled by themselves to the core network using a routing protocol message.

The first and second BRAS apparatus 100 and 200 receive a Q-in-Q frame from each CPE via the L2 switch 300 when relaying communication. When the frame is a frame for Internet access, the first and second BRAS apparatus 100 and 200 terminate the Q-in-Q tunnel and transfer the frame/packet from each CPE to the core network.

Figure 3:
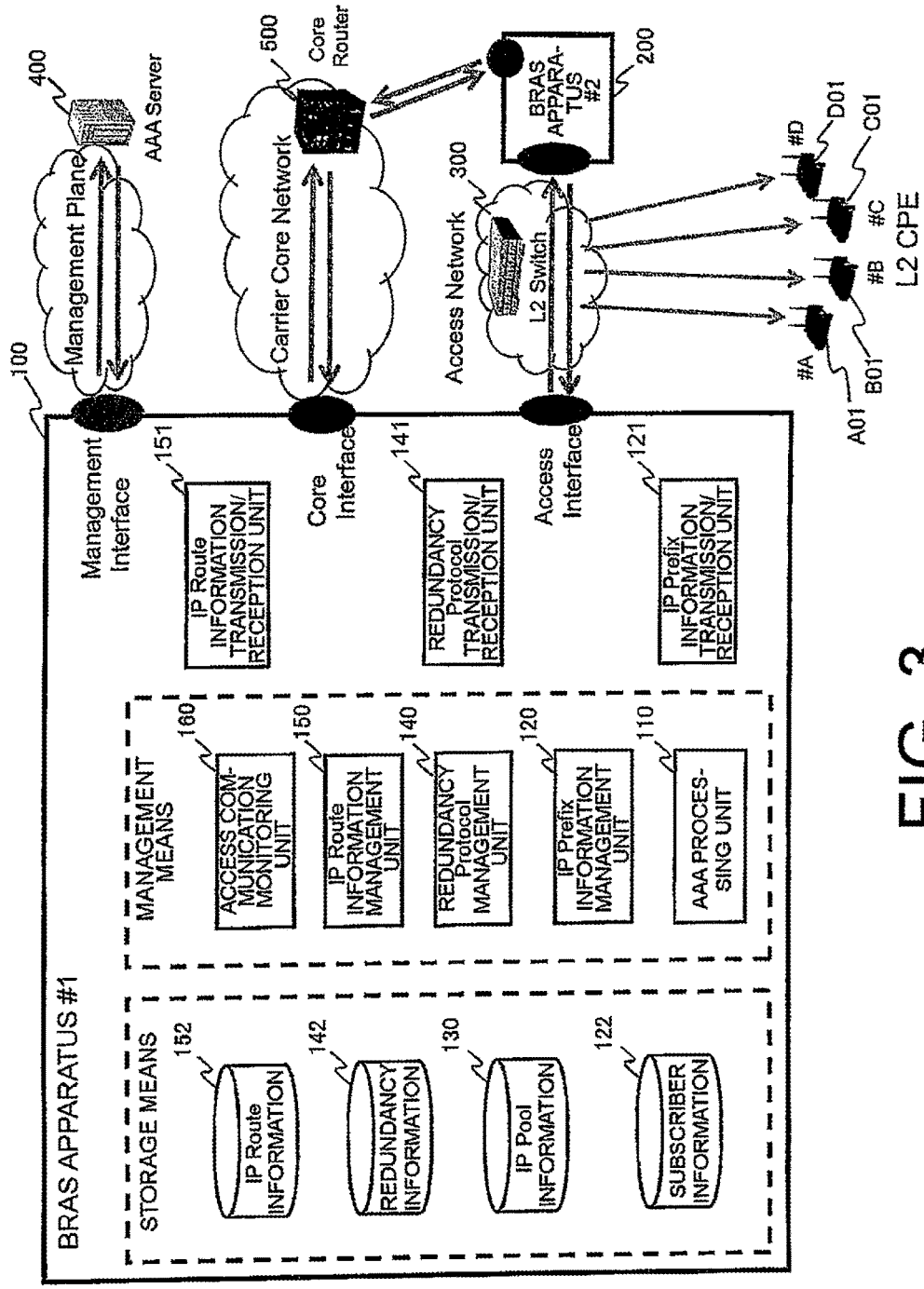
FIG. 3 is a configuration diagram for illustrating a BRAS apparatus according to the embodiment.

FIG. 3 is a configuration diagram for illustrating the first BRAS apparatus 100. The second BRAS apparatus 200 has the same configuration. FIG. 4 represents tables each for showing an example of initial settings of each setting information held by the first BRAS apparatus 100 or the second BRAS apparatus 200. Subscriber information 122 (*a*), IP pool information 130 (*c*), redundancy information 142 (*e*), and IP route information 152 (*g*) represent setting information on the first BRAS apparatus 100. Subscriber information 222 (*b*), IP pool information 230 (*d*), redundancy information 242 (*f*), and IP route information 252 (*h*) represent setting information on the second BRAS apparatus 200. In this example, those pieces of information are set so that, normally, the first BRAS apparatus 100 handles subscriber terminals with s-tag=1,000 and the second BRAS apparatus 200 handles subscriber terminals with s-tag=2,000.

The first BRAS apparatus 100 is set to have the subscriber information 122, the IP pool information 130, the redundancy information 142, and the IP route information 152. The IP pool information 130 and the redundancy information 142 of the first BRAS apparatus 100 are set so as to adapt to the network configuration as preliminary setting before operation.

The first BRAS apparatus 100 includes an AAA processing unit 110. Traffic from a new CPE causes the AAA processing unit 110 to transmit an authentication request to the CPE. Further, when the AAA processing unit 110 receives an authentication response (containing, for example, subscriber ID and IP pool name) from the AAA server 400, the AAA processing unit 110 includes the information in the subscriber information 122, and sends the IP pool name designated by the AAA server 400 to an IP prefix information management unit 120.

The IP prefix information management unit 120 reads the IP pool information 130 to select an IP prefix to be assigned to the subscriber from within an IP pool prefix that corresponds to the IP pool name received from the AAA processing unit 110. At this time, the IP prefix information management unit 120 selects an IP prefix of the subscriber that is already recorded in accordance with the procedure described later when there is such an IP prefix. The IP prefix information management unit 120 notifies an IP prefix information transmission/reception unit 121 of the selected IP prefix. In this manner, the IP prefix information management unit 120 notifies the subscriber of the notified IP prefix via the IP prefix information transmission/reception unit 121. Further, the IP prefix information management unit 120 includes the IP prefix assigned to the subscriber in the subscriber information 122.

As described later, when there is an IP prefix that is already recorded, the IP prefix information management unit 120 may immediately assign the IP prefix based on the recorded information without necessarily transmitting an authentication request to the AAA server 400 at the time of reception of the authentication request for the CPE. For example, the IP prefix information management unit 120 may record an authentication valid period as the subscriber information 122, or may omit, execute in parallel, or report afterward the authentication processing with the AAA server 400 depending on reliability of the CPE. The subscriber ID and the IP pool name recorded as the subscriber information 122 may be acquired from an arbitrary message from the counter apparatus (BRAS apparatus 200) or the AAA server 400 periodically.

A redundancy protocol management unit 140 is configured to read as appropriate settings of the redundancy information 142 to notify as appropriate a redundancy protocol transmission/reception unit 141 of information to be described in a redundancy protocol message. The redundancy protocol transmission/reception unit 141 transmits/receives as appropriate a redundancy protocol message, for example, a virtual router redundancy protocol (VRRP) message. This redundancy protocol message is transmitted by being capsuled with an s-tag set in the redundancy information 142 and received by a redundancy protocol transmission/reception unit 241 of the counter second BRAS apparatus 200, which forms a redundancy configuration with the first BRAS apparatus 100. Similarly, a redundancy protocol message transmitted by the redundancy protocol transmission/reception unit 241 of the second BRAS apparatus 200 is also transmitted by being capsuled with an s-tag set in the redundancy information 242 and received by the redundancy protocol transmission/reception unit 141 of the first BRAS apparatus 100.

After exchange of redundancy protocol messages between the first BRAS apparatus 100 and the second BRAS apparatus 200, the redundancy protocol management unit 140 determines which of the first BRAS apparatus 100 and the second BRAS apparatus 200 plays the role of the master (active system) or the backup (standby system) in the redundancy configuration for each s-tag. The redundancy protocol management unit 140 includes the status indicating the master/backup in the redundancy information 142.

An IP route information management unit 150 is configured to monitor conditions of the redundancy information 142 and the IP pool information 130 at all times. The IP route information management unit 150 checks an update status, and when those pieces of information are updated, the IP route information management unit 150 determines whether or not IP pool prefixes need to be advertised. In general, the change in IP pool prefix associated with a terminal or a terminal group having the master status in the redundancy information 142 needs to be advertised to a predetermined destination. When the IP pool prefix in the master status is changed, the IP route information management unit 150 notifies the IP route information transmission/reception unit 151 of the change, and advertises new route information to the core router 500.

Further, when an idle time recorded as communication status information corresponding to the subject IP pool prefix is not 0, the IP route information management unit 150 increments the metric of route information to be advertised in accordance with the value. In this embodiment, columns of the communication status information are provided in the redundancy information, and values of respective statuses are associated with one another with the redundancy group as a key.

Addition of this processing causes the route information on an apparatus side currently communicating to/from the CPE to have a smaller metric than the route information on the other apparatus side even in, for example, a case where both the first BRAS apparatus 100 and the second BRAS apparatus 200 are set to the active system for a certain s-tag.

With this, routing in the core network is maintained normally, and communication of the CPE (subscriber) is not disconnected.

Regarding the processing of the IP route information management unit 150 described above, an access communication monitoring unit 160 is configured to monitor communication of a subscriber terminal or a subscriber terminal group conducted through an access interface for an s-tag having the master status in the redundancy information. When communication is not performed continuously, the access communication monitoring unit 160 updates the idle time in the redundancy information 142 every predetermined period (for example, 60 seconds).

[Description of Operation]

Next, with reference to FIG. 5 to FIG. 15, various kinds of operations of the gateway redundancy system are described using tables and flowcharts.

Figure 5:
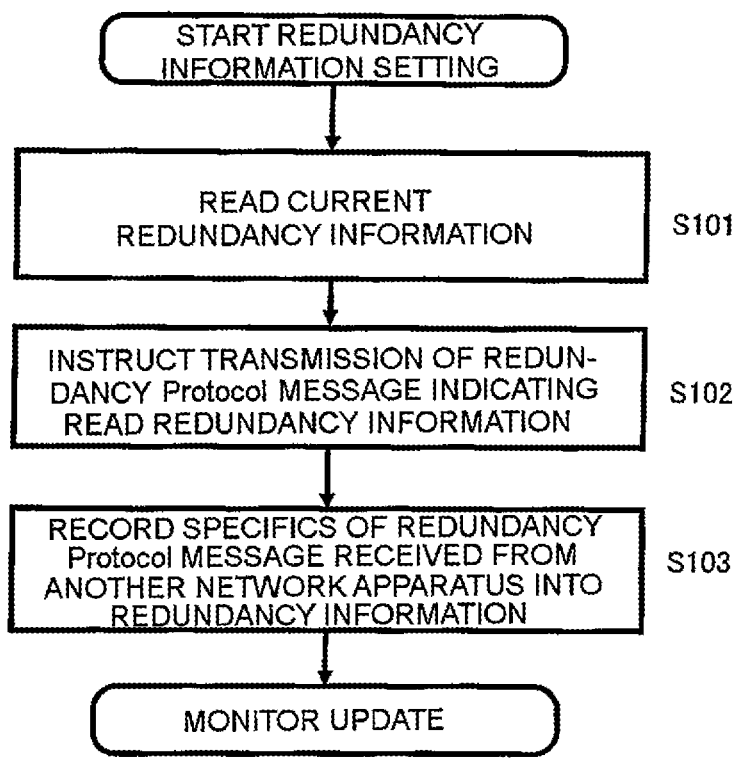
FIG. 5 is a flowchart for illustrating an operation to be performed by the BRAS apparatus 100 to initially set and update redundancy information through use of a redundancy protocol.

FIG. 5 is a flowchart for illustrating an operation to be performed by the BRAS apparatus 100 to initially set and update redundancy information through use of a redundancy protocol.

The second BRAS apparatus 200 also operates in the same manner.

First, the redundancy protocol management unit 140 reads redundancy settings contained in the redundancy information 142 (S101). Next, the redundancy protocol management unit 140 instructs transmission/reception of a redundancy protocol message for each of the s-tags (in this example, s-tag=1,000 or 2,000) set in the redundancy protocol transmission/reception unit 141 (S102). In response to this instruction, the redundancy protocol transmission/reception unit 141 transmits a redundancy protocol message for each of the s-tags specified by the redundancy protocol management unit 140.

When the status has changed due to states of transmission/reception of a redundancy protocol message, the redundancy protocol transmission/reception unit 141 notifies as appropriate the redundancy protocol management unit 140 of the s-tag and the status (information on whether the s-tag has the master status or the backup status). The redundancy protocol management unit 140 includes information notified by the redundancy protocol transmission/reception unit 141 in the redundancy information 142 (S103).

FIG. 6 is an illustration of an example of changes in the redundancy information 142 and 242 updated through exchange of redundancy protocol messages between the first and second BRAS apparatus 100 and 200. In this manner, redundancy information is updated appropriately in the BRAS apparatus 100 and 200.

Figure 7:
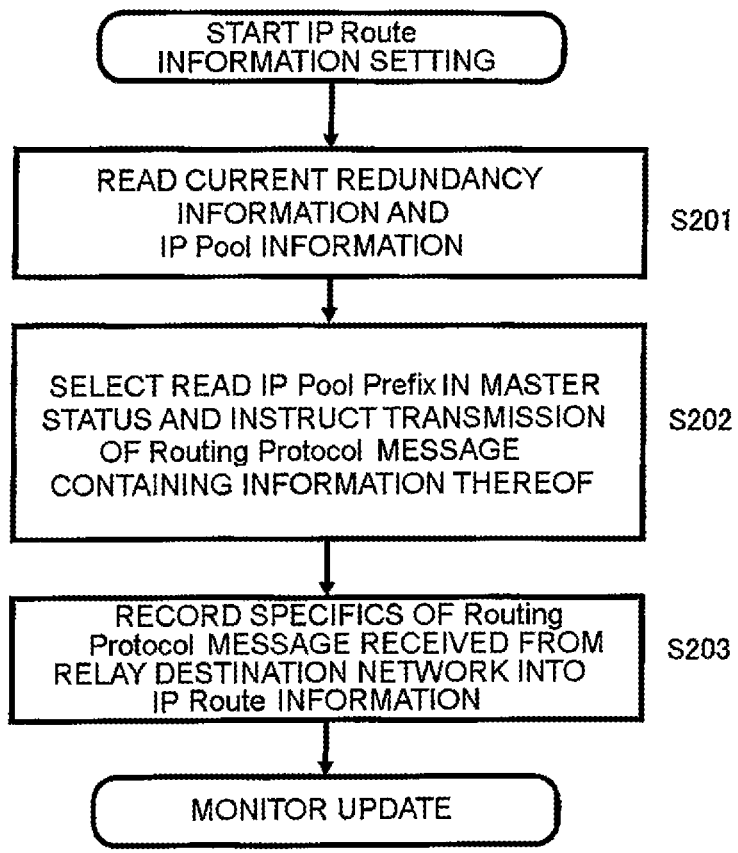
FIG. 7 is a flowchart for illustrating an operation to be performed by the BRAS apparatus 100 to advertise an IP pool prefix of a terminal being handled by the BRAS apparatus 100 to a core network using a routing protocol.

FIG. 7 is a flowchart for illustrating an operation to be performed by the first BRAS apparatus 100 to advertise an IP pool prefix of a terminal being handled by the first BRAS apparatus 100 to a core network using a routing protocol.

The IP route information management unit 150 refers to the IP pool information 130 and the redundancy information 142 to extract an IP pool prefix having a redundancy group in the master status (S201). The IP pool prefix in the master status is a set of pieces of used address information assigned to CPEs (group) handled by the subject BRAS apparatus.

The IP route information management unit 150 includes the information on the IP pool prefix in the IP route information 152, and instructs the IP route information transmission/reception unit 151 to transmit a routing protocol message containing the specifics thereof (S202). A set default value may be used as the metric for indicating the priority of IP route information.

The IP route information transmission/reception unit 151 advertises the IP route information notified by the IP route information management unit 150 to the core interface.

Further, the IP route information transmission/reception unit 151 notifies the IP route information management unit 150 of specifics of a routing protocol message received from the core interface. The IP route information management unit 150 includes the route information notified by the IP route information transmission/reception unit 151 in the IP route information 152 (S203).

Figure 8:
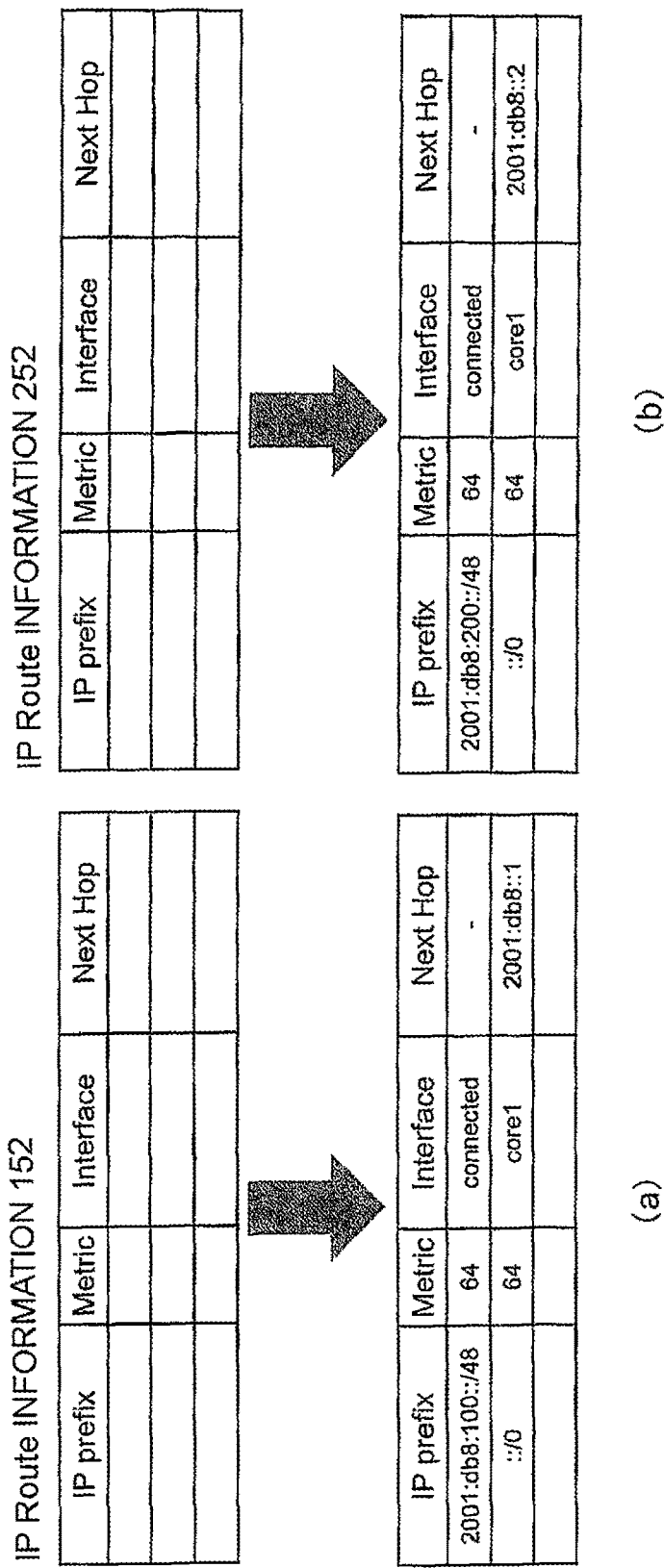
FIG. 8 is an explanatory diagram for exemplifying changes in IP route information 152 and 252 updated through exchange of routing protocol messages.

FIG. 8 is an illustration of an example of changes in the IP route information 152 and 252 updated through transmission/reception of a routing protocol message in the first and second BRAS apparatus 100 and 200. In this manner, the IP route information is updated appropriately in the first and second BRAS apparatus 100 and 200.

Figure 9:
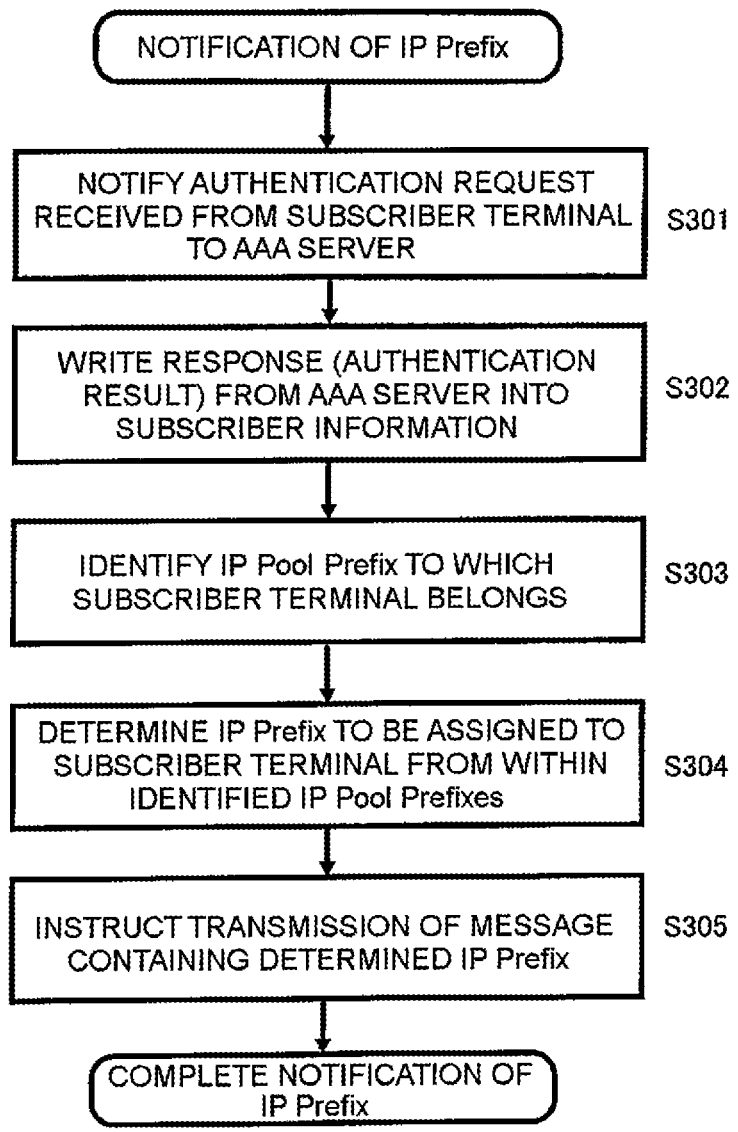
FIG. 9 is a flowchart for illustrating an operation to be performed by the BRAS apparatus 100 to notify a subscriber of an IP prefix when the subscriber starts to be handled.

FIG. 9 is a flowchart for illustrating an operation to notify a subscriber of an IP prefix when the subscriber starts to be handled.

When a subscriber first communicates to/from the AAA processing unit 110, the AAA processing unit 110 requests the AAA server 400 to authenticate the subscriber (S301). The AAA server 400 performs subscriber authentication to send an authentication result as a response. The authentication result contains information on the subscriber such as an ID of the subscriber or an IP pool name used by the subscriber.

In response to the authentication result from the AAA server 400, the AAA processing unit 110 includes, in the subscriber information 122, information on the subscriber that is contained in the authentication result (S302). Further, the AAA processing unit 110 notifies the IP prefix information management unit 120 of the IP pool name of the subscriber. The IP prefix information management unit 120 may read the subscriber information 122.

The IP prefix information management unit 120 refers to the IP pool information 130 to identify an IP pool prefix corresponding to the notified IP pool name (S303).

The IP prefix information management unit 120 determines an IP prefix to be assigned to the subscriber from within the identified IP pool prefixes (S304).

The IP prefix information management unit 120 notifies the IP prefix transmission/reception unit 121 of the determined IP prefix and additional information (information on the s-tag/c-tag read from the subscriber information 122) for instruction to transmit (advertise) an IP prefix message (S305).

The IP prefix transmission/reception unit 121 transmits an IP prefix message to the access network based on the notified information. This notification of an IP prefix is capsuled with the s-tag and the c-tag, and reaches the CPE of the subject subscriber via the L2 switch 300.

For example, the router advertisement (RA) method of IPv6 can be used for advertisement of the IP prefix.

Figure 10:
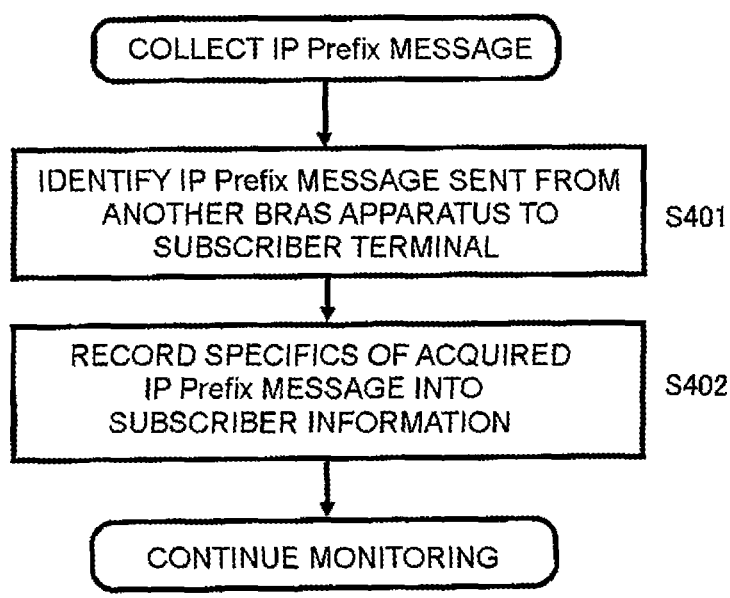
FIG. 10 is a flowchart for illustrating an operation to be performed by the BRAS apparatus 100 to snoop notification of an IP prefix message.

FIG. 10 is a flowchart for illustrating processing of snooping notification of an IP prefix message of the counter apparatus (second BRAS apparatus 200) by the first BRAS apparatus 100.

It is assumed that the second BRAS apparatus 200 notifies an IP prefix to the CPE handled by the second BRAS apparatus 200 at an arbitrary timing. This advertisement processing corresponds to the operation of the first BRAS apparatus 100 described with reference to FIG. 9. The IP prefix notified by the second BRAS apparatus 200 also reaches the first BRAS apparatus 100 via the L2 switch 300.

The first BRAS apparatus 100 receives the IP prefix notified by the second BRAS apparatus 200.

The IP prefix information management unit 120 may notify the IP prefix transmission/reception unit 121 in advance of a target to be snooped (subscriber terminal or subscriber terminal group), or may manage all the IP prefix messages that have reached the first BRAS apparatus 100 in the subscriber information 122.

The IP prefix transmission/reception unit 121 notifies the IP prefix information management unit 120 of specifics of the received IP prefix message for a CPE.

The IP prefix information management unit 120 identifies IP prefix information and additional information (s-tag, c-tag, and the like) of the notified specifics (S401), and includes those pieces of information in the subscriber information 122 (S402). Continuity of communication is improved in many scenes by holding those pieces of information.

Figure 11:
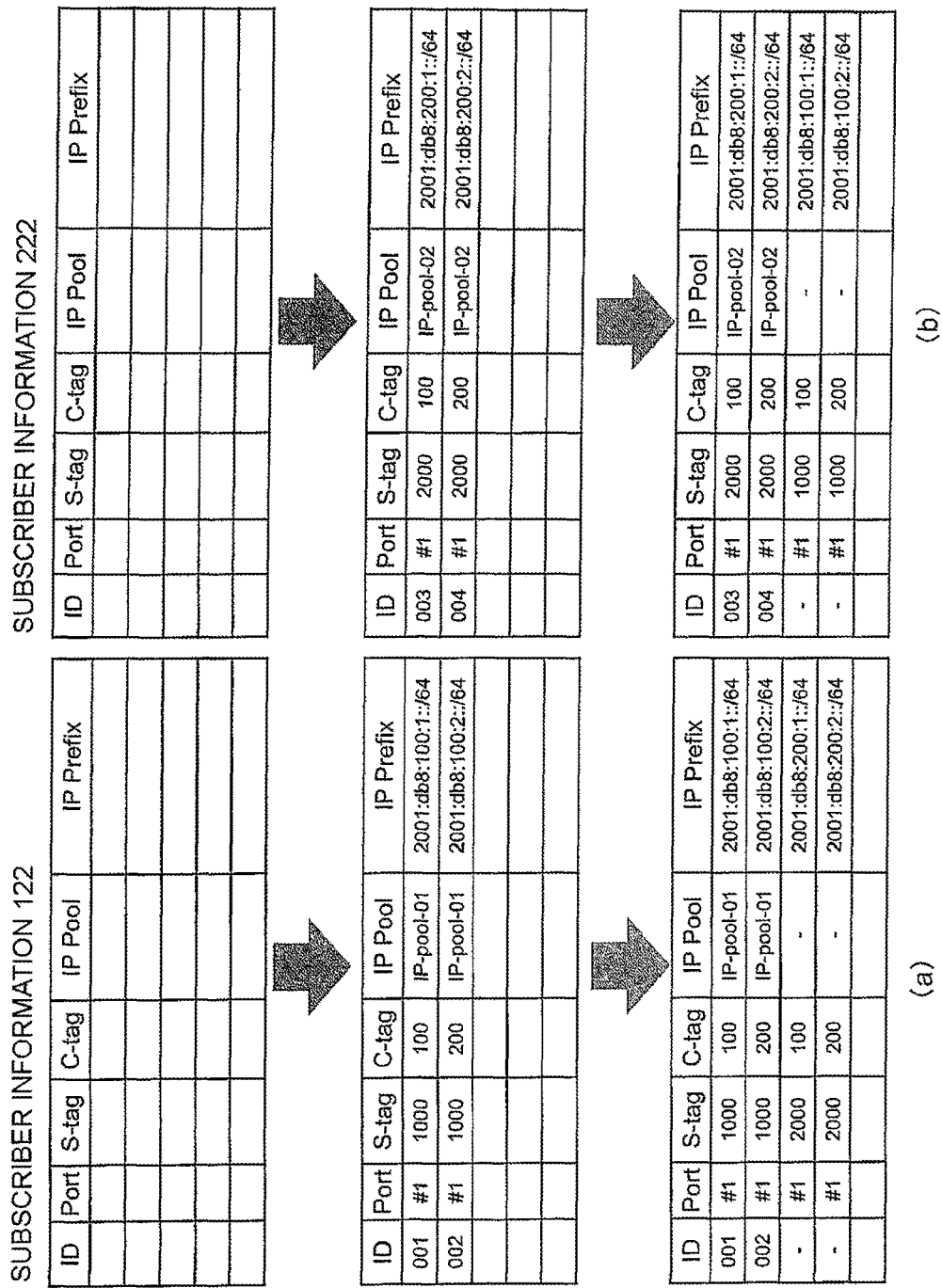
FIG. 11 is an explanatory diagram for exemplifying changes in subscriber information 122 and 222 updated through exchange of IP prefix messages.

FIG. 11 is an illustration of an example of changes in the subscriber information 122 and 222 updated through transmission/reception of IP prefix messages between the BRAS apparatus 100 and 200. In this manner, subscriber information is updated appropriately in the first and second BRAS apparatus 100 and 200.

Figure 12:
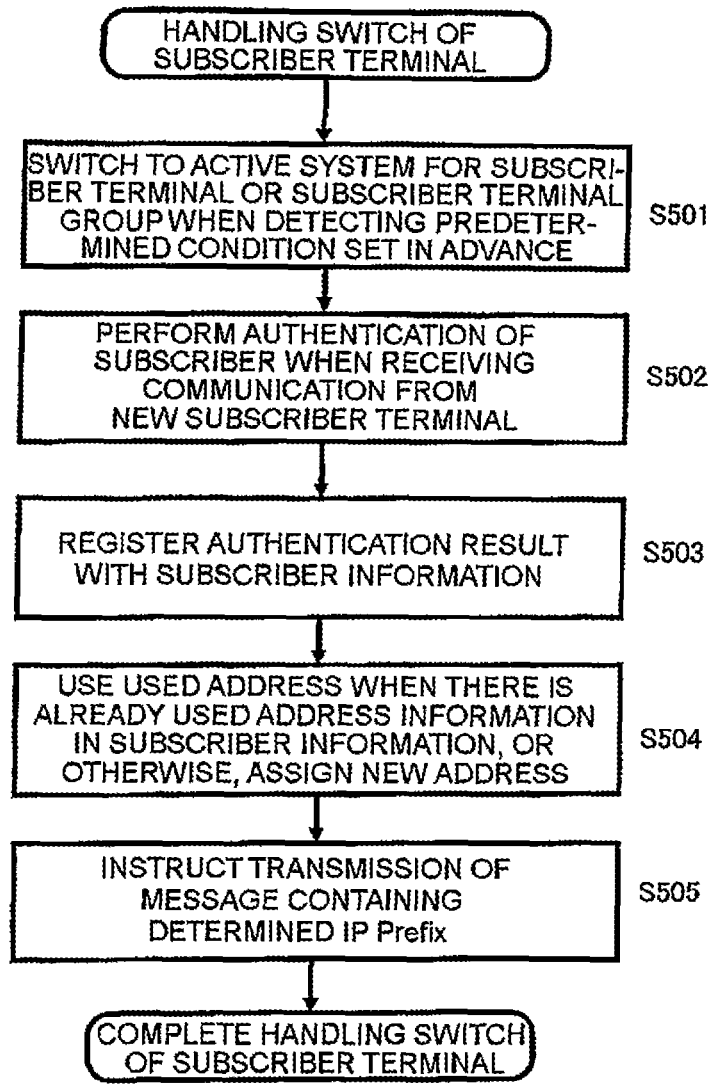
FIG. 12 is a flowchart for illustrating an operation to be performed by the BRAS apparatus 100 to switch handling of a subscriber terminal due to a failure of an access network.

FIG. 12 is a flowchart for illustrating an operation to switch handling of a subscriber terminal due to a failure of the access network.

It is assumed that a certain failure has occurred in the access network and the CPEs A01, B01, C01, and D01 do not communicate to/from the second BRAS apparatus 200. This failure also disables reception of redundancy protocol messages between the first BRAS apparatus 100 and the second BRAS apparatus 200. Under this failure, the gateway redundancy system makes a change as a whole redundancy network such that the first BRAS apparatus 100 handles the CPEs C01 and D01 in place of the second BRAS apparatus 200.

After the failure has occurred, the redundancy protocol transmission/reception unit 141 of the first BRAS apparatus 100 does not receive a redundancy protocol message for the redundancy group 2 from the second BRAS apparatus 200.

This causes the redundancy protocol management unit 140, which operates autonomously, to start an operation to switch from the standby system for the subscriber terminal or the subscriber terminal group to the active system based on settings of switching conditions set in advance (S501). In this case, the set switching condition specifies that a redundancy protocol message is not received from the second BRAS apparatus 200 for a predetermined period of time.

When the CPEs C01 and D01 (subscriber terminals to be newly handled) communicate to/from the AAA processing unit 110, the AAA processing unit 110 requests the AAA server 400 to authenticate each subscriber (S502).

When the AAA processing unit 110 receives an authentication response from the AAA server 400, the AAA processing unit 110 includes information on the subscriber in the subscriber information 122 (S503), and notifies the IP prefix information management unit 120 of the IP pool name of the subscriber. The IP prefix information management unit 120 may monitor the subscriber information 122 to identify change in the subscriber information.

The IP pool information management unit 120 reads the IP pool prefix of the notified IP pool name from a part of the IP pool information 130, and when the relevant subscriber information is identified, the IP pool information management unit 120 selects the IP prefix that has been managed as an IP prefix of the subscriber to be used by the first BRAS apparatus (S504). The identification of the subscriber may be performed based on the match of the s-tag and c-tag. In other cases, another technique may be used to identify the subscriber.

Whether or not there is relevant subscriber information is determined by whether or not the BRAS apparatus 100 has successfully snooped the used address information assigned by the second BRAS apparatus 200 to the CPE before.

When the registered IP prefix falls outside the IP pool prefix, the IP pool information management unit 120 may perform processing of newly selecting an IP prefix from within the IP pool prefix.

With this operation, the CPEs C01 and D01 can continue to use the same IP prefix as the one that has been handled by the second BRAS apparatus 200 in the first BRAS apparatus 100.

After that, the IP prefix information management unit 120 notifies the IP prefix transmission/reception unit 121 of the selected IP prefix and additional information (information on the s-tag/c-tag contained in the subscriber information 122) for instruction to transmit a message (S505).

The IP prefix transmission/reception unit 121 transmits an IP prefix message to the access network based on the notified information.

Figure 13:
FIG. 13 is an explanatory diagram for exemplifying changes in the subscriber information 122 and 222 updated through switch of handling of the subscriber terminal.

FIG. 13 is an illustration of an example of changes in the subscriber information 122 and 222 updated through a series of operations. In this manner, subscriber information is updated in the first and second BRAS apparatus 100 and 200 to maintain continuity of communication.

Figure 14:
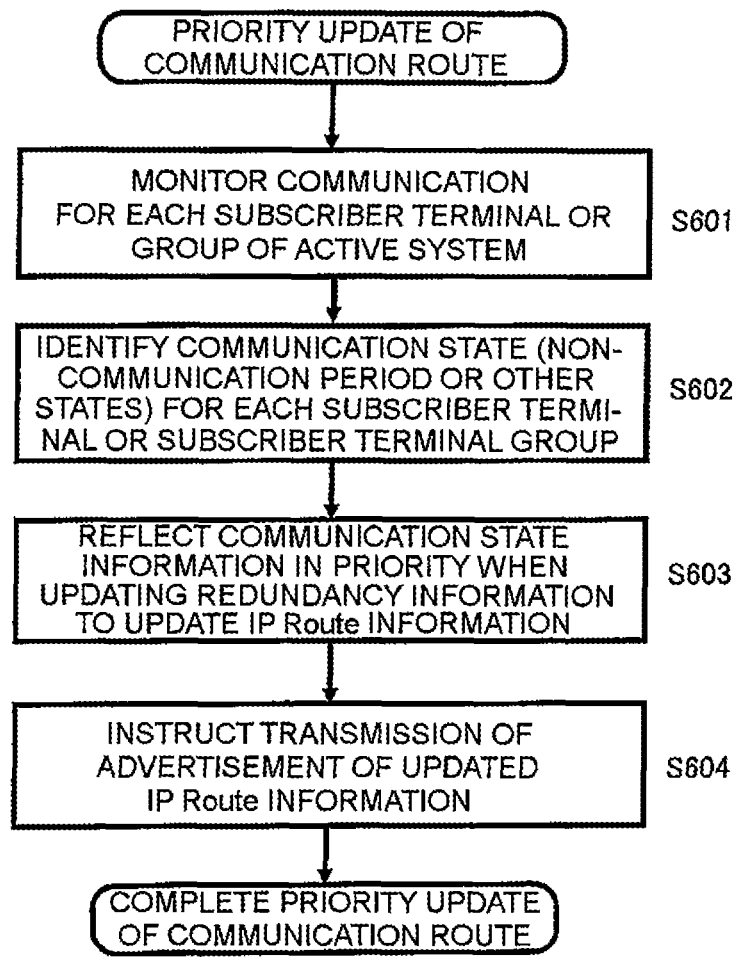
FIG. 14 is a flowchart for illustrating an operation to be performed by the BRAS apparatus 200 to advertise routing information with an adjusted priority.

FIG. 14 is a flowchart for illustrating an operation to advertise routing information with an adjusted priority. This processing operation provides a system for preventing pieces of routing information advertised by the first and second BRAS apparatus 100 and 200, which are operating autonomously, from being the same.

It is assumed that a certain failure has occurred in the access network and the CPEs A01, B01, C01, and D01 do not communicate to/from the second BRAS apparatus 200. This failure also disables reception of redundancy protocol messages between the first BRAS apparatus 100 and the second BRAS apparatus 200. Under this failure, the gateway redundancy system makes a change as a whole redundancy network such that the first BRAS apparatus 100 handles the CPEs C01 and D01 in place of the second BRAS apparatus 200.

In the following, a description is given of an operation of the second BRAS apparatus 200. The description is given on the assumption that components of the second BRAS apparatus 200 perform the same operations as those of the first BRAS apparatus 100. Reference numerals of the components of the second BRAS apparatus 200 correspond to those of the components of the first BRAS apparatus 100.

An access communication monitoring unit 260 of the second BRAS apparatus 200 refers to the redundancy information 242 as appropriate to monitor communication at all times, which can be identified by the access interface and contains an s-tag of the redundancy group in the master status (S601).

When communication is not performed for a predetermined period of time for the s-tag being monitored, the access communication monitoring unit 260 updates the communication status (in this example, idle time) of the redundancy group having the s-tag contained in the redundancy information 242 (S602). In this example, every time communication is not performed continuously for 15 seconds, the access communication monitoring unit 260 adds a value of the idle time to the redundancy information 142, with the result that communication is not performed continuously for 360 seconds.

Update of the redundancy information 242 causes an IP route information management unit 250 to read an IP pool prefix contained in the IP pool information 230, a status (master/backup status) contained in the redundancy information 242, and a value of the idle time. Then, the IP route information management unit 250 updates the IP route information 252 (S603), and instructs an IP route information transmission/reception unit 251 to advertise the IP pool prefix in the master status (S604).

In this case, when the idle time has a value of 1 or more, the IP route information management unit 250 increments the metric in the IP route information to indicate that the CPE using the s-tag is in a non-communication state (from the viewpoint of identification by the second BRAS apparatus). In this example, every time communication is not performed continuously for 15 seconds, the metric is incremented by 1 to decrease the priority of a communication route via the second BRAS apparatus. Further, the metric may be incremented/decremented by detecting a predetermined amount or more of errors or identifying the communication success rate in addition to detection of non-communication.

The IP route information transmission/reception unit 251 advertises the IP route information notified by the IP route information management unit 250 through the core interface. At this time, the IP route message advertised by the second BRAS apparatus 200 has the metric=84 through reflection of 360 seconds of idle time.

On the other hand, with a similar operation, an IP route message transmitted by the first BRAS apparatus 100 has the metric=64 (default value). Thus, the core router 500 transmits packets, which are to be delivered to those IP routes, to the first BRAS apparatus 100 having a smaller metric (the core router 500 selects the first BRAS apparatus 100 as the next hop for packets to be delivered to advertised IP routes).

With this operation, the first BRAS apparatus 100 and the second BRAS apparatus 200 autonomously reflect communication monitoring results to advertise route information messages having different metric values, respectively.

As a result, communication from the core network does not fall into a route failure, and all the CPEs A01, B01, C01, and D01 can continue communication normally.

FIG. 15 is an illustration of an example of changes in the redundancy information 142 and 242 and the IP route information 152 and 252 updated through transmission/reception of route information messages between the first and second BRAS apparatus 100 and 200. In this manner, priorities of communication routes in the first and second BRAS apparatus 100 and 200 are updated appropriately.

In this manner, the BRAS apparatus monitors communication on the access network side to reflect the non-communication state or other states in priorities of the IP route information. With this, even when a failure has occurred in an active-active gateway redundancy configuration, the normality of a communication route, for example, the core network, becomes more robust and continuity of communication is improved in many scenes.

The components of the network relay apparatus may be implemented by using a combination of hardware and software. In the mode of combining hardware and software, a program according to this invention is expanded in a random access memory (RAM), and hardware including various kinds of processors may be operated based on the program to implement the components. Further, this program may be recorded on a non-transitory recording medium for distribution. The program recorded on the recording medium is read to the memory in a wired or wireless manner or via a recording medium to operate the processor and the like. Examples of the recording medium include an optical disc, a magnetic disk, a semiconductor memory device, and a hard disk.

Another description of the above-mentioned embodiment is that it is possible to achieve the embodiment by causing the processor included in the network relay apparatus to operate as a memory unit configured to record the redundancy status and the subscriber status based on a program expanded on the RAM and to operate as a management unit configured to: monitor communication; record used address information assigned by another network relay apparatus to a subscriber terminal; and sequentially advertise an internal status to the notification destination.

As described above, the network relay apparatus to which this invention is applied may improve the continuity of communication between the subscriber terminal and the relay destination network as a gateway redundancy system.

The embodiment and the Example have been illustrated and described above, but changes such as separation and merging of the block components and a switch of processing steps can be freely carried out as long as the purport and the above-mentioned functions of this invention are satisfied, and the above description does not limit this invention.

Further, part or whole of the above-mentioned embodiment can also be described as follows. The following supplementary notes are not intended to limit this invention.

[Supplementary Note 1]

A network relay apparatus for relaying communication between an access network and a relay destination network, comprising:

a storage unit configured to store, as an internal status, a redundancy status for indicating whether the network relay apparatus operates as an active system or a standby system for each subscriber terminal or subscriber terminal group, and a subscriber status for indicating a list of used address information for each subscriber terminal; and a management unit configured to:

monitor communication between another network relay apparatus in a redundancy configuration and a subscriber terminal group;

record, into the storage unit, used address information assigned by the another network relay apparatus to a subscriber terminal as a part of the subscriber status; and notify or advertise the sequentially recorded internal status to a notification destination sequentially at a predetermined timing.

[Supplementary Note 2]

A network relay apparatus according to the above-mentioned supplementary note, wherein the management unit is configured to:

monitor a message notified by the another network relay apparatus in a redundancy configuration to the subscriber terminal or the subscriber terminal group; and read, from the storage unit, when the network relay apparatus switches to operate as an active system for a given subscriber terminal for which the internal status indicates a standby system, used address information that has been used by the given subscriber terminal, to continue communication between the given subscriber terminal and a relay destination network with the used address information that has been used by the given subscriber terminal.

[Supplementary Note 3]
A network relay apparatus according to the above-mentioned supplementary notes, wherein the management unit is configured to:
monitor communication status information for each subscriber terminal or subscriber terminal group included in the internal status; and
advertise communication path information to a relay destination network apparatus after increasing or decreasing a priority of a communication route via the network relay apparatus in accordance with the communication status information.

[Supplementary Note 4]
A network relay apparatus according to the above-mentioned supplementary notes, wherein the network relay apparatus is configured to:
use an IP pool, which comprises a group of addresses, as the used address information;
manage a plurality of the same IP pools as IP pools of the another network relay apparatus in a redundancy configuration; and
use an IP pool that is not used for operation of the another network relay apparatus serving as an active system, for operation of the network relay apparatus serving as an active system.

[Supplementary Note 5]
A network relay apparatus according to the above-mentioned supplementary notes, wherein the management unit is configured to, when the management unit updates the redundancy status to switch to an active system and receives communication from a subscriber terminal or a subscriber terminal group for which the management unit relays communication and the subscriber status already contains used address information, set used address information assigned by the another network relay apparatus to the subscriber terminal as a used address of the subscriber terminal by omitting authentication of the subscriber terminal or in parallel to the authentication.

[Supplementary Note 6]
A network relay apparatus according to the above-mentioned supplementary notes,
wherein the network relay apparatus and the another network relay apparatus each comprise a BRAS apparatus,
wherein the relay destination network comprises a core network,
wherein the subscriber terminal comprises customer premises equipment (CPE), and
wherein IPv6 and virtual router redundancy protocol (VRRP) are used as communication protocols, and a communication path between the CPE and the core network is set to have a redundancy configuration for each service-tag.

[Supplementary Note 7]
A gateway redundancy system, comprising a plurality of network relay apparatus each of which is configured to relay communication between an access network and a relay destination network as a gateway and to store, in a storage unit, an internal status for determining an operation to be performed for the relaying;
each of the plurality of network relay apparatus being configured to:
sequentially record into the storage unit, as the internal status, a redundancy status for indicating whether the each of a plurality of network relay apparatus operates as an active system or a standby system for each subscriber terminal or subscriber terminal group, and a subscriber status for indicating a list of used address information for each subscriber terminal;
notify or advertise a message containing a predetermined status to a notification destination sequentially at a predetermined timing; and
monitor communication that has reached the each of the plurality of network relay apparatus to sequentially record used address information assigned by another network relay apparatus to a subscriber terminal into the storage unit while relaying communication between the access network and the relay destination network.

[Supplementary Note 8]
A gateway redundancy system according to the abovementioned supplementary note, wherein the each of a plurality of network relay apparatus is configured to:
monitor a message notified by the another network relay apparatus in a redundancy configuration to the subscriber terminal or the subscriber terminal group; and
read, from the storage unit, when the network relay apparatus switches to operate as an active system for a given subscriber terminal for which the internal status indicates a standby system, used address information that has been used by the given subscriber terminal, to continue communication between the given subscriber terminal and a relay destination network with the used address information that has been used by the given subscriber terminal.

[Supplementary Note 9]
A gateway redundancy system according to the abovementioned supplementary notes, wherein the each of a plurality of the network relay apparatus is configured to:
monitor communication status information for each subscriber terminal or subscriber terminal group included in the internal status; and
advertise communication path information to a relay destination network apparatus after increasing or decreasing a priority of a communication route via the network relay apparatus in accordance with the communication status information.

[Supplementary Note 10]
A gateway redundancy system according to the abovementioned supplementary notes, wherein each of a plurality of the network relay apparatus is configured to:
use an IP pool, which comprises a group of addresses, as the used address information;
manage a plurality of the same IP pools as IP pools of the another network relay apparatus in a redundancy configuration; and
use an IP pool that is not used for operation of the another network relay apparatus serving as an active system, for operation of the network relay apparatus serving as an active system.

[Supplementary Note 11]
A gateway redundancy system according to the abovementioned supplementary notes, wherein each of a plurality of the network relay apparatus is configured to, when the network relay apparatus updates the redundancy status to switch to an active system and receives communication from a subscriber terminal or a subscriber terminal group for which the network relay apparatus relays communication and the subscriber status already contains used address information, set used address information assigned by the another network relay apparatus to the subscriber terminal as a used address of the subscriber terminal by omitting authentication of the subscriber terminal or in parallel to the authentication.

[Supplementary Note 12]
A gateway redundancy system according to the abovementioned supplementary notes, wherein the each of a plurality of the network relay apparatus comprises a BRAS apparatus, wherein the relay destination network comprises a core network, wherein the subscriber terminal comprises customer premises equipment (CPE), and wherein IPv6 and virtual router redundancy protocol (VRRP) are used as communication protocols, and a communication path between the CPE and the core network is set to have a redundancy configuration for each service-tag.

[Supplementary Note 13]

A program which is recorded on a non-transitory computer-readable medium, the program being for causing a processor of a network relay apparatus to operate as:

a logical storage unit configured to record a redundancy status for indicating whether the network relay apparatus operates as an active system or a standby system for each subscriber terminal or subscriber terminal group, and a subscriber status for indicating a list of used address information for each subscriber terminal; and a management unit configured to:

monitor communication between another network relay apparatus in a redundancy configuration and a subscriber terminal group;

record, into a physical storage unit handling the logical storage unit, used address information assigned by the another network relay apparatus to a subscriber terminal as a part of the subscriber status; and notify or advertise a message containing a predetermined status to a notification destination sequentially at a predetermined timing.

[Supplementary Note 14]

A program according to the above-mentioned supplementary note, the program being for causing the processor to:

monitor a message notified by the another network relay apparatus in a redundancy configuration to the subscriber terminal or the subscriber terminal group; and read, from the storage unit, when the network relay apparatus switches to operate as an active system for a given subscriber terminal for which the internal status indicates a standby system, used address information that has been used by the given subscriber terminal, to continue communication between the given subscriber terminal and a relay destination network with the used address information that has been used by the given subscriber terminal.

[Supplementary Note 15]

A program according to the above-mentioned supplementary notes, the program being for causing the processor to:

monitor communication status information for each subscriber terminal or subscriber terminal group included in the internal status; and advertise communication path information to a relay destination network apparatus after increasing or decreasing a priority of a communication route via the network relay apparatus in accordance with the communication status information.

[Supplementary Note 16]

A program according to the above-mentioned supplementary notes, the program being for causing the processor to:

use an IP pool, which comprises a group of addresses, as the used address information used in the network relay apparatus;

manage a plurality of the same IP pools as IP pools of the another network relay apparatus in a redundancy configuration; and use an IP pool that is not used for operation of the another network relay apparatus serving as an active system, for operation of the network relay apparatus serving as an active system.

[Supplementary Note 17]

A program according to the above-mentioned supplementary notes, the program being for causing the processor to:

when the redundancy status is updated to switch to an active system and communication is received from a subscriber terminal or a subscriber terminal group for which the management unit relays communication and when the subscriber status already contains used address information, set used address information assigned by the another network relay apparatus to the subscriber terminal as a used address of the subscriber terminal by omitting authentication of the subscriber terminal or in parallel to the authentication.

[Supplementary Note 18]

A redundancy method for a network relay apparatus, the redundancy method comprising:

sequentially managing, by a network relay apparatus configured to relay communication between an access network and a relay destination network, in a storage unit, a redundancy status for indicating whether the network relay apparatus operates as an active system or a standby system for each subscriber terminal or subscriber terminal group, and a subscriber status for indicating a list of used address information for each subscriber terminal;

notifying or advertising, by the network relay apparatus, a message containing a predetermined status to a notification destination sequentially at a predetermined timing;

monitoring, by the network relay apparatus, communication between another network relay apparatus in a redundancy configuration and a subscriber terminal group; and recording and managing, by the network relay apparatus, in the storage unit, used address information assigned by the another network relay apparatus to a subscriber terminal as a part of the subscriber status.

[Supplementary Note 19]

A redundancy method for a network relay apparatus according to the above-mentioned supplementary note, wherein the network relay apparatus is configured to:

monitor a message notified by the another network relay apparatus in a redundancy configuration to the subscriber terminal or the subscriber terminal group; and read, from the storage unit, when the network relay apparatus switches to operate as an active system for a given subscriber terminal for which the internal status indicates a standby system, used address information that has been used by the given subscriber terminal, to continue communication between the given subscriber terminal and a relay destination network with the used address information that has been used by the given subscriber terminal.

[Supplementary Note 20]

A redundancy method for a network relay apparatus according to the above-mentioned supplementary note, wherein the network relay apparatus is configured to:

monitor communication status information for each subscriber terminal or subscriber terminal group included in the internal status; and advertise communication path information to a relay destination network apparatus after increasing or decreasing a priority of a communication route via the network relay apparatus in accordance with the communication status information.

[Supplementary Note 21]

A redundancy method for a network relay apparatus according to the above-mentioned supplementary notes, wherein the network relay apparatus is configured to:

use an IP pool, which comprises a group of addresses, as the used address information;

manage a plurality of the same IP pools as IP pools of the another network relay apparatus in a redundancy configuration; and use an IP pool that is not used for operation of the another network relay apparatus serving as an active system, for operation of the network relay apparatus serving as an active system.

[Supplementary Note 22]

A redundancy method for a network relay apparatus according to the above-mentioned supplementary notes, wherein the network relay apparatus is configured to, when the redundancy status is updated to switch to an active system and communication is received from a subscriber terminal or a subscriber terminal group for which the management unit relays communication and when the subscriber status already contains used address information, set used address information assigned by the another network relay apparatus to the subscriber terminal as a used address of the subscriber terminal by omitting authentication of the subscriber terminal or in parallel to the authentication.

INDUSTRIAL APPLICABILITY

This invention can also be applied to a general network relay apparatus, for example, an L3 router, as long as the network relay apparatus is a gateway in a redundancy configuration. Further, this invention may also be achieved by a virtual broadband remote access server (vBRAS) using a virtualization technology.

Further, VRRP and IPv6 RA are taken as examples of the redundancy protocol and advertisement of the IP prefix, respectively, but another protocol having the equivalent function may be used to notify specifics of the message.

This application claims priority from Japanese Patent Application No. 2015-013978, filed on Jan. 28, 2015, the entire disclosure of which is incorporated herein by reference.

EXPLANATION OF REFERENCE SIGNS 10 network relay apparatus
11 storage unit
12 management unit
100, 200 BRAS apparatus
110 AAA processing unit
120 IP prefix information management unit
121 IP prefix information transmission/reception unit
122 subscriber information
130 IP pool information
140 redundancy protocol management unit
141 redundancy protocol transmission/reception unit
142 redundancy information
150 IP route information management unit
152 IP route information
160 access communication monitoring unit
A01, B01, C01, D01 CPE
300 switch
400 AAA server
500 core router

The invention claimed is:

1. A network relay apparatus for relaying communication by active-active configuration with another network relay apparatus between an access network and a relay destination network, comprising:

a storage that includes, as an internal status, i) a redundancy status for indicating whether the network relay apparatus operates as an active system or a standby system for each subscriber terminal or subscriber terminal group, and ii) a subscriber status for indicating a list of each used address information for each subscriber terminal of a standby system for the network relay apparatus and the another network relay apparatus; and a processor configured to:

monitor each message of the access network by snooping between the another network relay apparatus and the each subscriber terminal or subscriber terminal group in the active-active configuration, the snooping providing a snooped used address assigned to the each subscriber terminal or subscriber terminal group;

record, into the subscriber status of the each subscriber terminal or subscriber terminal group, the snooped used address information assigned by the another network relay apparatus to the each subscriber terminal;

notify or advertise the recorded internal status to a notification destination at a predetermined timing; and read, from the subscriber status, when the network relay apparatus switches to operate as active system for a given subscriber terminal for which the internal status indicates the standby system, snooped used address information that has been used by the given subscriber terminal, to continue communication between the given subscriber terminal and the relay destination network with the snooped used address information that has been used by the given subscriber terminal.

2. The network relay apparatus according to claim 1, wherein the processor is configured to:

monitor communication status information for each subscriber terminal or subscriber terminal group included in the internal status; and advertise communication path information to a relay destination network apparatus after increasing or decreasing a priority of a communication route via the network relay apparatus in accordance with the communication status information.

3. The network relay apparatus according to claim 2, wherein the processor is configured to, when the processor updates the redundancy status to switch to an active system and receives communication from a subscriber terminal or a subscriber terminal group for which the processor relays communication and the subscriber status already contains used address information, set used address information assigned by the another network relay apparatus to the subscriber terminal as a used address of the subscriber terminal by omitting authentication of the subscriber terminal or in parallel to the authentication.

4. The network relay apparatus according to claim 2, wherein the network relay apparatus and the another network relay apparatus each comprise a BRAS apparatus, wherein the relay destination network comprises a core network, wherein the subscriber terminal comprises customer premises equipment (CPE), and wherein IPv6 and virtual router redundancy protocol (VRRP) are used as communication protocols, and a communication path between the CPE and the core network is set to have a redundancy configuration for each service-tag.

5. The network relay apparatus according to claim 1, wherein the network relay apparatus is configured to:

use an IP pool, which comprises a group of addresses, as the used address information;
manage a plurality of the same IP pools as IP pools of the another network relay apparatus in a redundancy configuration; and
use an IP pool that is not used for operation of the another network relay apparatus serving as an active system, for operation of the network relay apparatus serving as an active system.

6. The network relay apparatus according to claim 5, wherein the processor is configured to, when the processor updates the redundancy status to switch to an active system and receives communication from a subscriber terminal or a subscriber terminal group for which the processor relays communication and the subscriber status already contains used address information, set used address information assigned by the another network relay apparatus to the subscriber terminal as a used address of the subscriber terminal by omitting authentication of the subscriber terminal or in parallel to the authentication.

7. The network relay apparatus according to claim 5,
wherein the network relay apparatus and the another network relay apparatus each comprise a BRAS apparatus,
wherein the relay destination network comprises a core network,
wherein the subscriber terminal comprises customer premises equipment (CPE), and
wherein IPv6 and virtual router redundancy protocol (VRRP) are used as communication protocols, and a communication path between the CPE and the core network is set to have a redundancy configuration for each service-tag.

8. The network relay apparatus according to claim 1, wherein the processor is configured to, when the processor updates the redundancy status to switch to an active system and receives communication from a subscriber terminal or a subscriber terminal group for which the processor relays communication and the subscriber status already contains used address information, set used address information assigned by the another network relay apparatus to the subscriber terminal as a used address of the subscriber terminal by omitting authentication of the subscriber terminal or in parallel to the authentication.

9. The network relay apparatus according to claim 8,
wherein the network relay apparatus and the another network relay apparatus each comprise a BRAS apparatus,
wherein the relay destination network comprises a core network,
wherein the subscriber terminal comprises customer premises equipment (CPE), and
wherein IPv6 and virtual router redundancy protocol (VRRP) are used as communication protocols, and a communication path between the CPE and the core network is set to have a redundancy configuration for each service-tag.

10. The network relay apparatus according to claim 1,
wherein the network relay apparatus and the another network relay apparatus each comprise a BRAS apparatus,
wherein the relay destination network comprises a core network,
wherein the subscriber terminal comprises customer premises equipment (CPE), and
wherein IPv6 and virtual router redundancy protocol (VRRP) are used as communication protocols, and a communication path between the CPE and the core network is set to have a redundancy configuration for each service-tag.

11. A redundancy method for a network relay apparatus, the redundancy method comprising:
sequentially managing, by a network relay apparatus comprising a storage unit and configured to relay communication by active-active configuration with another network relay apparatus between an access network and a relay destination network, in the storage unit that includes i) a redundancy status for indicating whether the network relay apparatus operates as an active system or a standby system for each subscriber terminal or subscriber terminal group, and ii) a subscriber status for indicating a list of each used address information for each subscriber terminal of a standby system for the network relay apparatus and the another network relay apparatus;
monitoring each message of the access network by snooping, by the network relay apparatus snooping between the another network relay apparatus and the each subscriber terminal or subscriber terminal group in the active-active configuration and a subscriber terminal group, the snooping providing a snooped used address assigned to the each subscriber terminal or subscriber terminal group;
recording, by the network relay apparatus, into the subscriber status of the each subscriber terminal or subscriber terminal group, the snooped used address information assigned by the another network relay apparatus to the each subscriber terminal as a part of the subscriber status;
notifying or advertising the recorded internal status to a notification destination at a predetermined timing; and
reading, from the subscriber status, when the network relay apparatus switches to operate as active system for a given subscriber terminal for which the internal status indicates the standby system, snooped used address information that has been used by the given subscriber terminal, to continue communication between the given subscriber terminal and the relay destination network with the snooped used address information that has been used by the given subscriber terminal.

12. A computer readable non-transitory recording medium having recorded thereon a program for causing a processor of a network relay apparatus to operate as:
a storage unit that records
i) a redundancy status for indicating whether the network relay apparatus operates as an active system or a standby system for each subscriber terminal or subscriber terminal group, and
ii) a subscriber status for indicating a list of each used address information for each subscriber terminal of a standby system for the network relay apparatus and the another network relay apparatus; and
a processing part that:
monitors each message of the access network by snooping between the another network relay apparatus and the each subscriber terminal or subscriber terminal group in the active-active configuration, the snooping providing a snooped used address assigned to the each subscriber terminal or subscriber terminal group;
records, into the subscriber status of the each subscriber terminal or subscriber terminal group of the storage unit, the snooped used address information assigned by the another network relay apparatus to the each subscriber terminal;

notifies or advertises the recorded internal status to a notification destination at a predetermined timing; and reads, from the subscriber status, when the network relay apparatus switches to operate as active system for a given subscriber terminal for which the internal status indicates the standby system, snooped used address information that has been used by the given subscriber terminal, to continue communication between the given subscriber terminal and the relay destination network with the snooped used address information that has been used by the given subscriber terminal.

\* \* \* \* \*